United States Patent [19]

Uchida

[11] 4,384,644
[45] May 24, 1983

[54] ROLL OF COIN WRAPPING PAPER

[75] Inventor: Isamu Uchida, Tokyo, Japan

[73] Assignee: Laurel Bank Machine Co., Ltd., Tokyo, Japan

[21] Appl. No.: 251,563

[22] Filed: Apr. 6, 1981

[30] Foreign Application Priority Data

Apr. 7, 1980 [JP] Japan .............................. 55-46664[U]

[51] Int. Cl.³ .................... B65D 65/28; B65D 65/32; B65D 65/36; B65D 3/26
[52] U.S. Cl. ................................... 206/0.8; 229/87.2; 206/605; 206/611
[58] Field of Search ...................... 206/0.8, 0.82, 459, 206/605, 604, 611, 484; 229/87.2, 76, 83; 133/1 A, 8 A

[56] References Cited

U.S. PATENT DOCUMENTS 1,337,941  4/1920  Morgan .............................. 229/87.2
3,506,183  4/1970  Turpin et al. ...................... 206/616
3,906,964  9/1975  Ushio et al. ....................... 133/1 A Primary Examiner—William Price
Assistant Examiner—Brenda J. Ehrhardt
Attorney, Agent, or Firm—Fleit & Jacobson

[57] ABSTRACT

A roll of coin wrapping paper includes streak portions which extend in the width direction of the paper and are arranged at a predetermined pitch in the longitudinal direction of the paper. The streak portions are formed by making such portions thicker than the other portions of the paper. The thicker portion is made by applying printing ink to the paper. Alternatively, the streak portion may be formed by making a series of perforations in the paper.

2 Claims, 5 Drawing Figures

ROLL OF COIN WRAPPING PAPER

BACKGROUND OF THE INVENTION

1. Field of the Invention

The present invention relates to a roll of coin wrapping paper in which the paper is wound on the outer periphery of a predetermined number of stacked coins and then is crimped at both ends thereof.

2. Description of the Prior Art

In conventional well-known coin wrapping machines which perform automatic wrapping of coins, a predetermined number of coins, for example fifty, are stacked in a piling cylinder and the stacked coins are fed among three wrapping rollers. Then, the wrapping rollers are abutted against the outer periphery of the stacked coins and rotative movement of the rollers causes the stacked coins to be rotated. During the rotation of the stacked coins, the leading end of a roll of wrapping paper is introduced between the rollers and the coins to be wound on the coins about two turns. Then, the wrapping paper is cut off. Thereafter, fastening or crimping claws are abutted against areas to be fastened at both ends of the wound wrapping paper to internally enfold both ends of the wound wrapping paper, whereby crimping is performed. After the fastening claws and the wrapping rollers are disengaged, the wrapped coins are discharged.

When it is desired to break open the wrapping paper with which the coins are wrapped, the wrapped coins are usually knocked against the corner of a desk etc. so that the wrapping paper is broken in circumferential direction so that the coins can be taken out. In such a case the coins must be taken out individually and sometimes the coins are scattered.

SUMMARY OF THE INVENTION

It is an object of the present invention to provide a roll of wrapping paper for use in a coin wrapping machine which permits the coins to be readily taken out of the wrapping paper with which the coins are wrapped.

According to the present invention, there is provided a roll or coin wrapping paper comprising streak portions which extend in the width direction of the paper and are arranged at a predetermined pitch in the longitudinal direction of the paper, whereby the paper can be readily torn at the streak portions.

DESCRIPTION OF THE DRAWINGS

Other objects and advantages of the present invention will become apparent from the following description made with reference to the accompanying drawings, in which.

DESCRIPTION OF THE PREFERRED EMBODIMENTS

Embodiments of the present invention will now be described in detail with reference to the accompanying drawings.

Referring now to drawings, a wrapping paper 1 is unwound from a rolled portion 1' thereof, and includes streak portions 2 which extend in the width direction of the paper and are arranged at a predetermined pitch in the longitudinal direction of the paper so that the paper can be readily torn at the streak portions.

The wrapping paper may be an opaque paper suitable for general wrapping, a transparent sheet such as synthetic resin film, or any suitable paper. The paper or sheet may have printing thereon. In conventional wrapping paper, the fibers or molecules of the paper are disposed in the longitudinal direction of the paper so that the paper can be readily broken in the circumferential direction. In the present invention, the direction in which the fibers or molecules are disposed may also be in the longitudinal direction but is preferably in the width direction.

Figure 1:
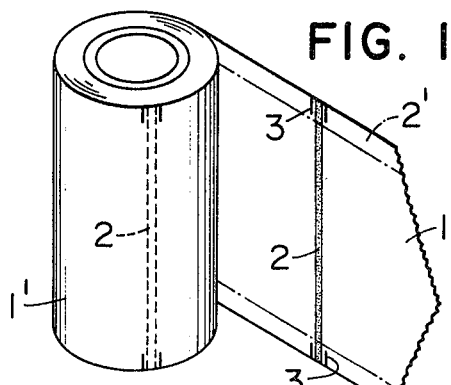
FIG. 1 is a perspective view of the paper.
Figure 2:
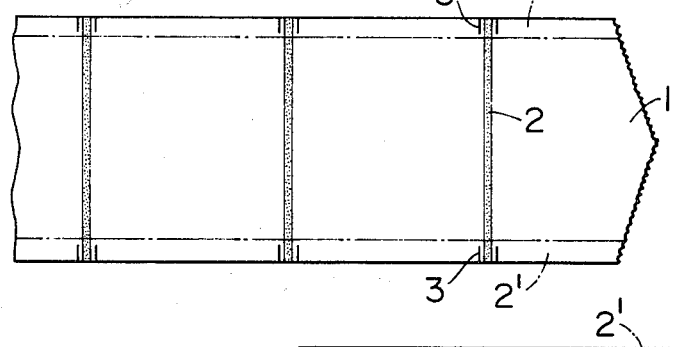
FIG. 2 is a partial elevational view of the paper.
Figure 3:
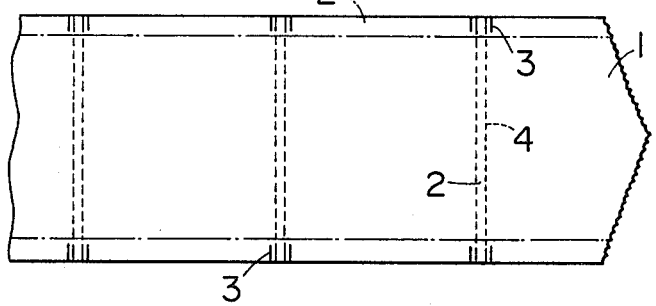
FIG. 3 is a partial elevational view of the paper of another embodiment.

Most preferably, the streak portions 2 are formed by printing. In other words, the streak portions are made by applying a hardenable printing ink, which may be colorless but is preferably colored on the surface of the paper. Preferably, the printing is made on the surface of the paper which is disposed inward when the wrapping paper 1 is wound on the stacked coins a. In case where a synthetic resin film is used, the streak portions may be formed somewhat more thickly than the remaining parts so as to be readily torn away from the remaining parts. As shown in FIG. 3, the streak portions may be defined by a series of perforations 4 which are formed in the transverse direction of the paper.

At least one of the upper and lower crimping areas 2' which are to be crimped with the crimping claws on one or both sides of the streak portions 2 in the wrapping paper 1 may be provided with a notch or notches 3, which may be easily formed in the manufacturing process.

Figure 4:
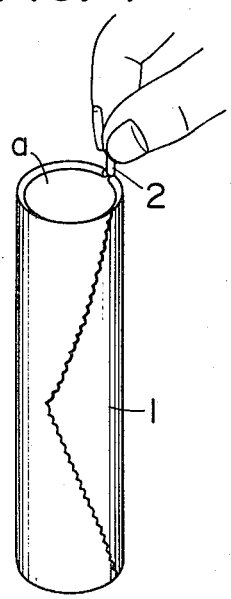
FIG. 4 is a perspective view showing how tearing open of the paper with which the coins are wrapped is begun.
Figure 5:
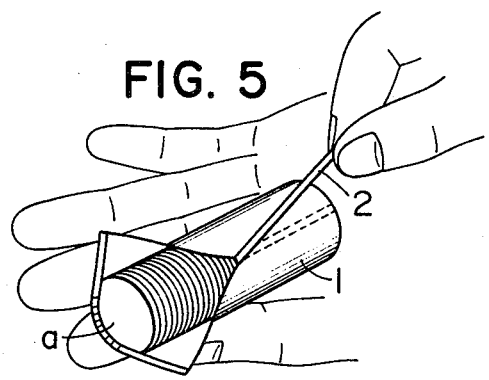
FIG. 5 is a perspective view showing the paper being torn.

When the stacked coins a are wrapped with the wrapping paper according to the present invention using the above-mentioned wrapping machine, in crimping the crimping areas 2' by means of the crimping claws, the streak portions cannot sufficiently be bent because of their stiffness. As a result, insufficient crimping would sometimes be caused. However, the insufficient crimping has almost no effect since the streak portions are restricted to minor portions of the circumference of the coins. In order to break the wrapping paper, one end of the streak portion 2 is raised up and pinched by the fingers as shown in FIG. 4 and then the end is pulled while the trunk portion of the coins is gripped by the hand. As a result, the streak portion 2 is readily separated from the remaining portion of the paper. At the time, the piled coins a are held by the edge of the crimping portion 2' so as not to scatter (see FIG. 5).

The present invention, thus, provides a wrapping paper which is not only readily processed and manufactured but also extremely easily to tear open.

What is claimed is:

1. A roll of coin wrapping paper comprising streak portions which extend in the width direction of the paper and are arranged at a predetermined pitch in the longitudinal direction of the paper, whereby the paper can be readily torn at the streak portions, the wrapping paper being formed from synthetic resin film, and said streak portion being formed by making a portion of the film thicker than the other portions of the film, the thicker portion being formed of the same resin film as the other portions.

2. A roll of coin wrapping paper comprising streak portions which extend in the width direction of the paper and are arranged at a predetermined pitch in the longitudinal direction of the paper, whereby the paper can be readily torn at the streak portions, said portion of the paper constituting the streak portion being made by applying a strip of printing ink to the paper, the ink upon hardening forming said streak portion.

* * * * *